Jan. 9, 1923.     1,441,418.
E. A. HALBLEIB.
POWER TRANSMISSION MECHANISM.
FILED MAY 28, 1913.

Witnesses:
Clarence W. Carroll
D. Gurnee

Inventor:
Edward A. Halbleib
by his attorneys
Davis & Dorsey

Patented Jan. 9, 1923.

1,441,418

UNITED STATES PATENT OFFICE.

EDWARD A. HALBLEIB, OF ROCHESTER, NEW YORK, ASSIGNOR TO NORTH EAST ELECTRIC COMPANY, OF ROCHESTER, NEW YORK, A CORPORATION OF NEW YORK.

POWER-TRANSMISSION MECHANISM.

Application filed May 28, 1913. Serial No. 770,545.

*To all whom it may concern:*

Be it known that I, EDWARD A. HALBLEIB, a citizen of the United States, and resident of Rochester, in the county of Monroe and State of New York, have invented certain new and useful Improvements in Power-Transmission Mechanism, of which the following is a specification.

This invention relates to mechanism whereby two rotary elements or shafts may be connected in such a manner that either of them may actuate the other in the same direction of rotation, but at different speed-ratios according as one or the other constitutes the driving-element.

In an application for Letters Patent of the United States filed by me February 8, 1913, Serial No. 747,185, I have disclosed mechanism, of the type in question, in which a shifting clutch-member is employed to cooperate with two other clutch-members alternatively, according as one rotary element or the other is to constitute the driver, the shifting clutch-member being moved manually, and the mechanism being provided with one-direction clutches so arranged as to permit either rotary element to overrun when being driven by power transmitted through the other rotary element. The present invention relates particularly to mechanism having the same characteristics, and the object of the invention is to eliminate the use of extraneous or manually-operable means for controlling the position of the shifting clutch-member, by the provision of automatic means for this purpose. To this end I employ, in the present mechanism, a clutch-member having helical connections with one of the rotary elements, these connections being adapted to cause a limited longitudinal movement of the clutch-member on said rotary element, in consequence of relative rotation of these parts, and also to cause the parts to rotate in unison at the limits of the relative movement. The relative rotation of these parts is produced automatically, through frictional connections between the clutch-member and the other rotary element, in consequence of variations in the relative speed of rotation of the two rotary elements.

In the accompanying drawings:—

Figure 1:
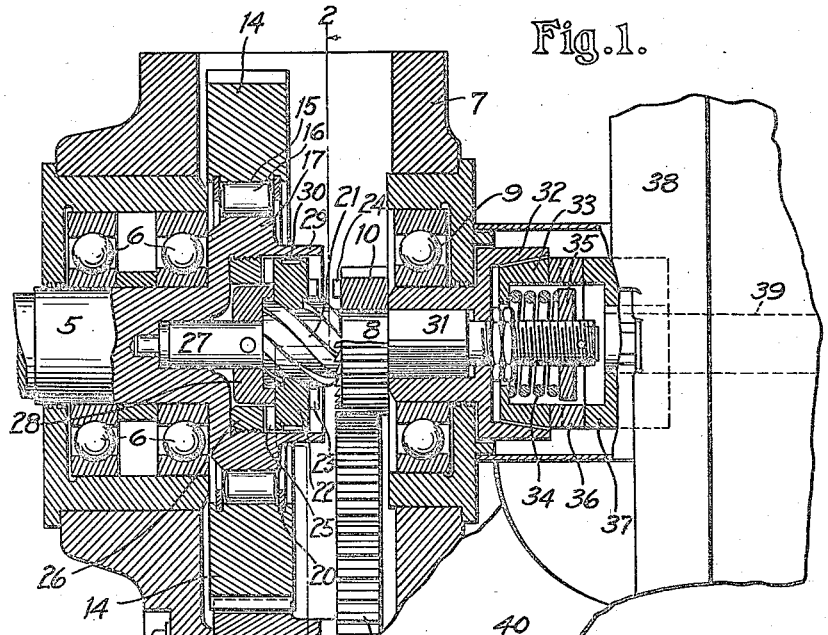
Figure 2:
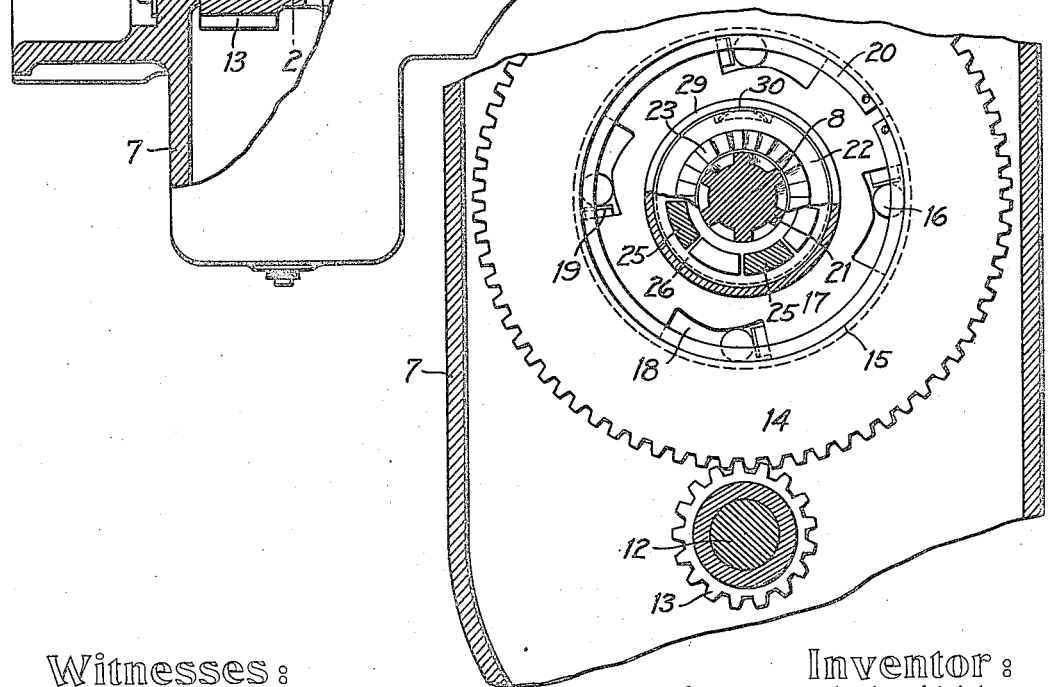

Fig. 1 is a vertical side-elevation of power-transmission mechanism embodying the present invention, mainly in section on a plane coincident with the axis of rotation of the parts of the mechanism; and Fig. 2 is a section on the line 2—2 in Fig. 1.

The invention is illustrated as embodied in power-transmission mechanism similar, in general construction and arrangement, to that in my said application, and adapted particularly for use in connection with an internal-combustion engine and an electric-generator or equivalent prime-mover, the generator being used alternatively to generate electricity, when the engine is in normal operation, or to act as an electric motor and provide power for starting the engine from a state of rest.

One of the rotary elements of the mechanism, which is hereinafter described as the "first rotary element" is in the form of a shaft 5, which may be connected, by any suitable means, with the crank-shaft or other rotary member of an engine. This shaft 5 is supported, by ball-bearings 6, in a casing 7 which encloses and supports the other parts of the mechanism. Another rotary element, which is adapted to be connected with the armature-shaft of an electric generator, is in the form of a short shaft 8, which is supported, near its right-hand end, by a ball-bearing 9 in the casing 7, the left-hand end of the shaft 8 having a reduced portion 27 which is journalled in a central recess in the shaft 5, so as to maintain the two shafts in axial alignment.

The speed-reducing gearing, through which the shaft 8 may actuate the shaft 5 in the operation of starting the engine, comprises a pinion 10 which is journalled loosely upon the shaft 8, and which meshes with a gear 11 journalled on a countershaft 12 fixed in the casing 7 parallel with the axes of the shafts 5 and 8. A second pinion 13, integral with the gear 11, meshes with a gear 14 which is concentric with the shaft 5.

The gear 14 is connected with the shaft 5 by means of a one-direction clutch of the roller-wedge type. The gear is annular in form, and its smooth inner surface 15 bears against a series of rollers 16. The right-hand end of the shaft 5 has an enlarged portion or shell 17, provided with a series of recesses 18 in which the rollers 16 move. The bottoms of these recesses are so inclined that when the gear 14 is rotated in the direction indicated by the arrows in Fig. 2, the rollers tend to move to the shallower portions of the recesses, so as to pinch between the two clutch-members and cause the shell 17 and the shaft 5 to be rotated. This action of the rollers is insured by spring-pressed followers 19 located between the rollers and the ends of the recesses 18, and the rollers are retained within the recesses, and the gear 14 is retained in place upon the shell 17, by means of removable snap-rings 20 seated in grooves in the gear.

To provide the helical connections hereinbefore referred to, the shaft 8 is provided with a plurality of screw-threads or ribs 21 of steep pitch, which engage corresponding threads in the inner surface of an annular clutch-member 22, loosely mounted upon the shaft 8. The clutch-member 22 has a series of beveled clutch-teeth at its right-hand face, which are adapted to cooperate with corresponding teeth 24 on the pinion 10. On its left-hand face the clutch-member 22 is provided with a series of square-faced clutch-teeth or jaws 25, which cooperate with a clutch-member fixed to the shaft 5. The latter clutch-member is in the form of a ring 26, which is screwed into the central socket of the shell 17.

The right-hand ends of the threads 24 provide a bearing to prevent left-hand longitudinal movement of the pinion upon the shaft 8, but the clutch-member 22 is free to move longitudinally, with an accompanying rotative movement, upon the shaft 8, as determined by the helical connections or threads between these parts, and accordingly it may move into operative engagement with the clutch-teeth upon either the pinion 10 or the ring 26.

The movements of the clutch-member 22 are controlled by frictional connections with the shaft 5. To this end the shell 17 has an integral cylindrical extension 29, providing a smooth inner friction surface which is engaged by a series of friction-springs 30 seated in pockets in the periphery of the clutch-member 22. During the normal operation of the engine the shaft 5 tends to rotate faster than the shaft 8, and in consequence, the frictional drag between the parts 29 and 30 and the clutch-member 22 causes the latter to rotate upon the shaft 8, and the helical connections cause a corresponding left-hand movement, so that the clutch-member 22 engages the clutch-member 26, and the shaft 8 is then driven directly, that is, at the same speed of rotation, by the shaft 5. To sustain the longitudinal thrust which the helical connections tend to cause between the clutch-member 22 and the shaft 8, a collar 28 is fixed upon the shaft in position to engage the left-hand surface of the clutch-member 22 when the latter is in driving connection with the member 26.

When the engine is at rest, and the generator is started in operation as an electric motor, the shaft 8 rotates in the normal direction, and in this case the frictional drag, owing to the fact that the part 29 is stationary, causes the clutch-member 22 to be shifted in the opposite direction, so as to operatively engage the clutch-teeth 24 on the pinion 10. In this case, therefore, the shaft 8 drives the pinion 10 and the other parts of the gearing, thus actuating the shaft 5 through the roller-wedge clutch, but at a reduced speed owing to the interposition of the gearing.

A valuable feature of the present arrangement resides in the fact that, although its operation is automatic under all normal conditions, it does not lock itself automatically against reverse rotation on the part of the shaft 5, such as is liable to occur in the case of a "back-kick" in the engine. This is due to the fact that the clutch-member 22 cannot be in engagement, at one time, with both of the clutch-members with which it cooperates. Accordingly, upon the occurrence of a back-kick in the engine the only consequence of the reverse rotation of the shaft 5 is to drive the gearing reversely, through the operation of the roller-wedge clutch, and cause the shiftable clutch-member to be moved into engagement with the pinion 10, so that reverse rotation is imparted to the shaft 8 and to the generator-shaft. As this reversal may occur, however, at a time when the generator-shaft is rotating rapidly in the normal direction, it is desirable to interpose, at some point in the mechanism, a yielding connection which will absorb the momentum of the armature of the generator, so that the reversal in its direction of rotation may be gradual. Such a yielding connection may be interposed at various points in the mechanism, but it is preferably introduced between the shaft 8 and the armature-shaft of the generator. To this end I employ a friction-coupling shown in Fig. 1. The shaft 8 has a squared-portion 31 which receives the correspondingly-recessed hub of a coupling-member 32. This member is provided with a conical inner surface, and a conical coupling-member 33 is seated frictionally against this surface, and is maintained in engagement therewith by a compression-spring 34, which is coiled about the screw-threaded end of the shaft 8 and seated against a nut 35 screwed thereon. The coupling-member 33 may be connected with the generator-shaft in any convenient manner, but I have shown it as so connected by means of coupling-members 36 and 37 which constitute elements of a coupling of the well-known Oldham type, whereby compensation may be made for slight inaccuracies in the alignment of the shaft 8 and the generator-shaft.

My invention is not limited to the embodiment thereof hereinbefore described and illustrated in the accompanying drawings, but it may be embodied in various other forms within the nature of the invention as it is defined in the following claims.

I claim:—

1. Power-transmission mechanism having, in combination, a first rotary element provided with a clutch-face; a second rotary element coaxial therewith; gearing through which the second element may actuate the first element, said gearing including a pinion coaxial with the second element but rotatable relatively thereto, and said pinion being provided with a clutch-face; a shifting clutch-member carried by the second element, between the first element and said pinion, and adapted to cooperate alternatively with said clutch-faces thereon; helical connections between the shifting clutch-member and the second element, whereby the clutch-member is caused to rotate normally with the second element, and to move longitudinally thereon, to a limited degree, in consequence of a limited relative rotation; and frictional connections between the first element and the shifting clutch-member, whereby the latter is moved, upon said helical connections, into driving-connection between the second element and the first element, or the second element and the pinion, according as one or the other of the rotary elements overruns the other in the normal direction of rotation.

2. Power-transmission mechanism having, in combination, a first rotary element provided with a clutch-face; a second rotary element coaxial therewith; speed-reducing gearing connected with the first rotary element by a one-direction clutch, said gearing including a pinion coaxial with the second element but rotatable relatively thereto, and said pinion being provided with a clutch-face; a shifting clutch-member carried by the second element, between the first element and said pinion, and adapted to cooperate alternatively with the clutch-members thereon; helical connections between the shifting clutch-member and the second element, whereby the clutch-member is caused to rotate normally with the second element, and to move longitudinally thereon, to a limited degree, in consequence of a limited relative rotation; and frictional connections between the first element and the shifting clutch-member, whereby the latter is moved, upon said helical connections, into driving-connection between the second element and the first element, or the second element and the pinion, according as one or the other of the rotary elements overruns the other in the normal direction of rotation.

3. In a starting and generating mechanism, the combination with an engine, and a dynamo-electric machine, of means for operatively connecting said machine to said engine at different speed ratios, said means comprising a shiftable member and means controlled automatically, according as the dynamo-electric machine constitutes the driving or the driven member, for shifting said member.

EDWARD A. HALBLEIB.

Witnesses:
FARNUM F. DORSEY,
D. GURNEE.